(12) United States Patent
Murillo

(10) Patent No.: US 6,905,177 B1
(45) Date of Patent: Jun. 14, 2005

(54) RIM SHIELD

(76) Inventor: Danny Murillo, 5405 Bayberry La., Tamarac, FL (US) 33319

(*) Notice: Subject to any disclaimer, the term of this patent is extended or adjusted under 35 U.S.C. 154(b) by 19 days.

(21) Appl. No.: 10/773,963

(22) Filed: Feb. 9, 2004

(51) Int. Cl.[7] .............................................. B60B 7/04
(52) U.S. Cl. ......................... 301/37.103; 301/37.104; 118/504
(58) Field of Search ..................... 301/37.103, 37.104; 118/504

(56) References Cited

U.S. PATENT DOCUMENTS

| | | | |
|---|---|---|---|
| 4,196,692 A | * | 4/1980 | Vanstrom .................... 118/504 |
| 4,628,858 A | * | 12/1986 | King et al. ................. 118/504 |
| 4,792,191 A | | 12/1988 | Farmer .................. 301/37.103 |
| 5,785,389 A | * | 7/1998 | Bradford ................. 301/37.42 |
| 6,485,106 B1 | * | 11/2002 | Hermansen et al. ... 301/37.103 |

* cited by examiner

Primary Examiner—Russell D. Stormer
(74) Attorney, Agent, or Firm—J. Sanchelima; A. Bordas

(57) ABSTRACT

A guard for wheel rims comprising a plurality of louvers and elongated shaft members. A housing member receives one end of the shafts and they are slidably received by cooperating track members mounted on one of the surfaces of the louvers. The shaft members are stacked and pivotally mounted to rotate over one common point. A locking assembly locks the relative position of the shaft members with respect to track members in accordance with the rim size. A locking assembly locks the relative angular positions of the louvers so that a user can selectively form a substantial arch to cover a substantial portion of a rim.

6 Claims, 4 Drawing Sheets

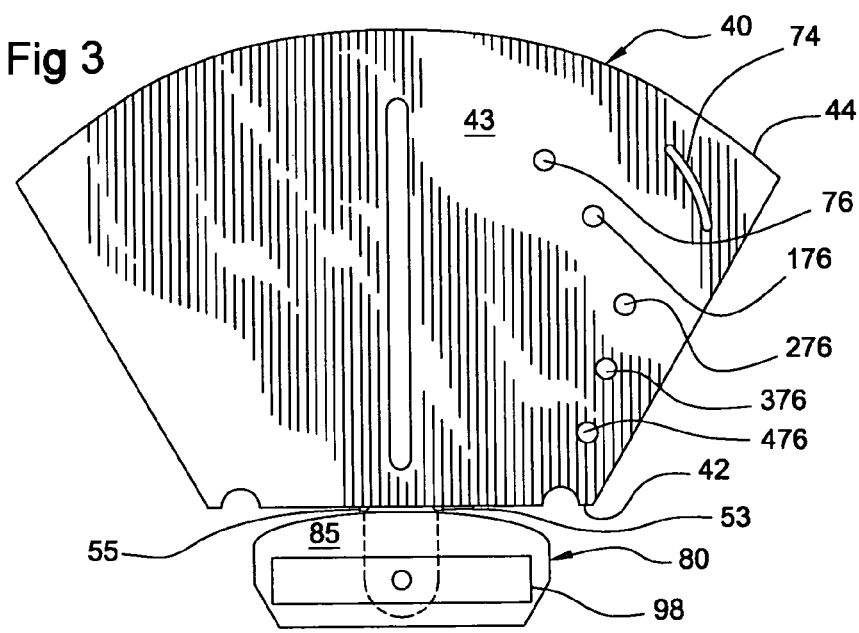
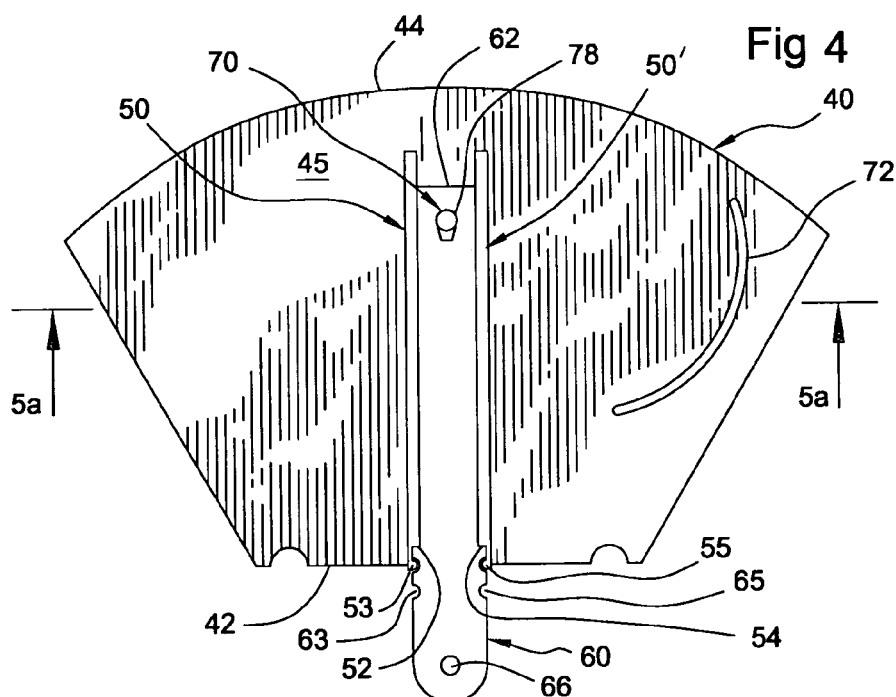
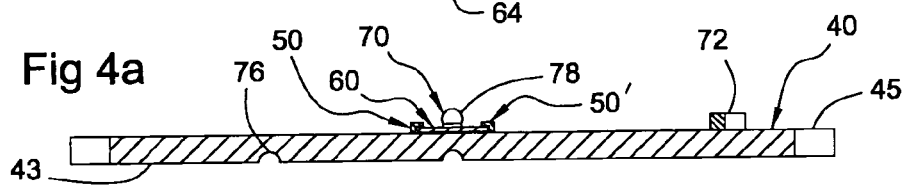

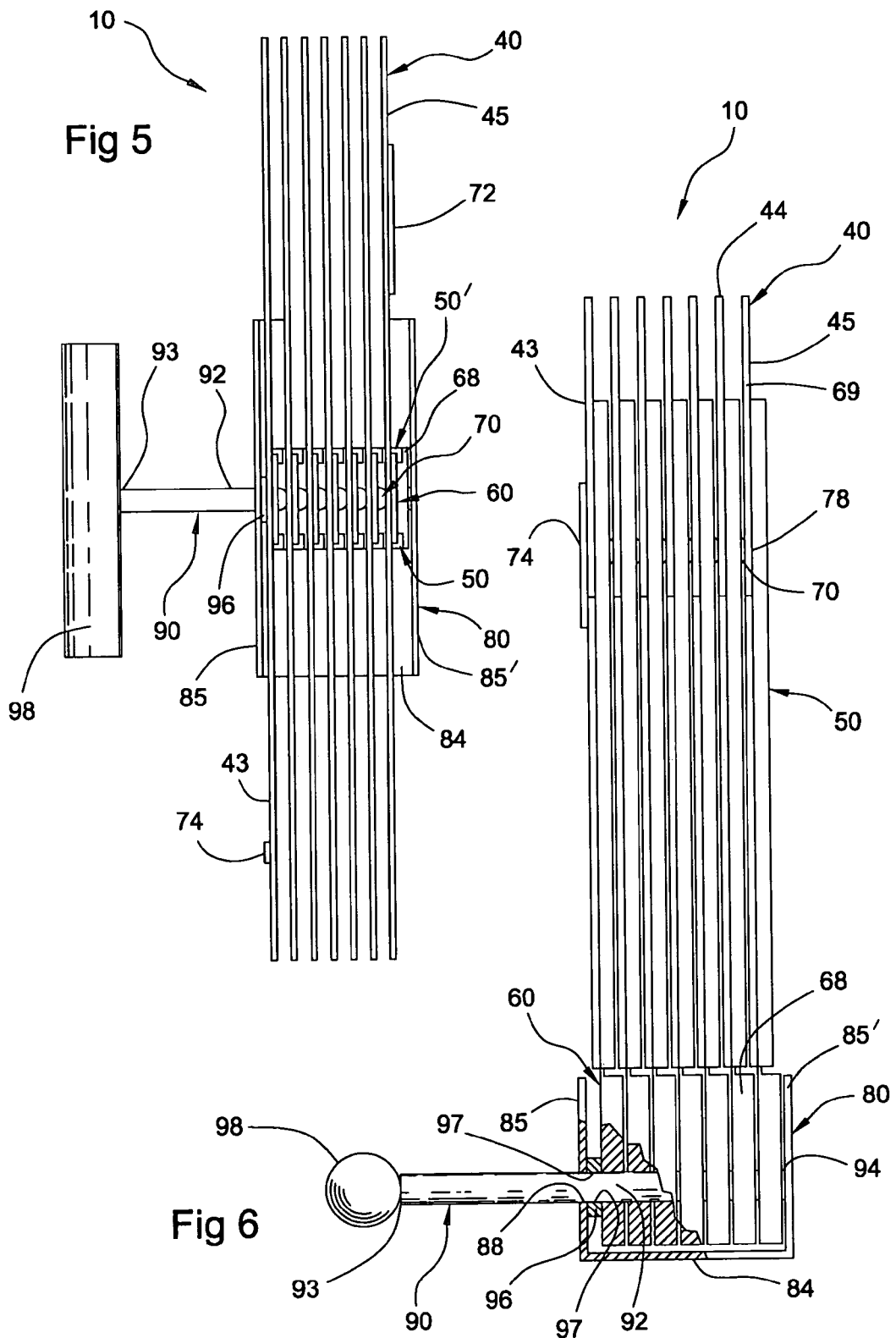

RIM SHIELD

BACKGROUND OF THE INVENTION

1. Field of the Invention

The present invention relates to a rim shield, and more particularly, to a rim shield comprising of a plurality of louvers that are selectively disposed in an arch.

2. Description of the Related Art

Several devices for guarding rims for wheels have been developed in the past. The object of these devices is to permit a user spray and clean vehicles' tires without affecting the rims. Many of today's rims are expensive and can be damaged with harsh chemicals used to clean the rubber of the tires. None of them, however, includes a plurality of louvers telescopically adjustable to different rim sizes. The shaft members in the present invention are stacked and pivotally mounted to rotate over one common point. A locking assembly locks the relative positions of the louvers so that a user can selectively form an arch to cover a substantial portion of a rim.

Applicant believes that the closest reference corresponds to U.S. Pat. No. 4,792,191 issued to Farmer for an Automobile Wheel Protector. This protector has fixed dimensions and can only be used for a given rim size. The present invention, on the other hand, can be adjusted to protect rims of different dimensions.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a guard for rims in wheels that permit a user to selectively form an arch to protect a substantial portion of the rims during cleaning and washing operations.

It is another object of this invention to provide a guard that is volumetrically efficient and compatible with rims of different sizes.

It is still another object of the present invention to provide a rim guard that can be readily handled with one hand freeing the user's other hand for the cleaning and washing operation.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 represents a front elevational view of the first louver and its corresponding shaft member.

FIG. 4 is a rear elevational view of the last louver mounted to a shaft member.

FIG. 4a is a cross-sectional view taken from line 5a—5a in FIG. 5.

FIG. 5 illustrates a top view of the rim shield with the louver members aligned (closed).

FIG. 6 shows a side elevational view of the rim shield with the louver members aligned (closed) with a partial cross section to show the axle and the spacer fixed to the housing front wall.

DETAILED DESCRIPTION OF THE PREFERRED EMBODIMENT

Figure 1:
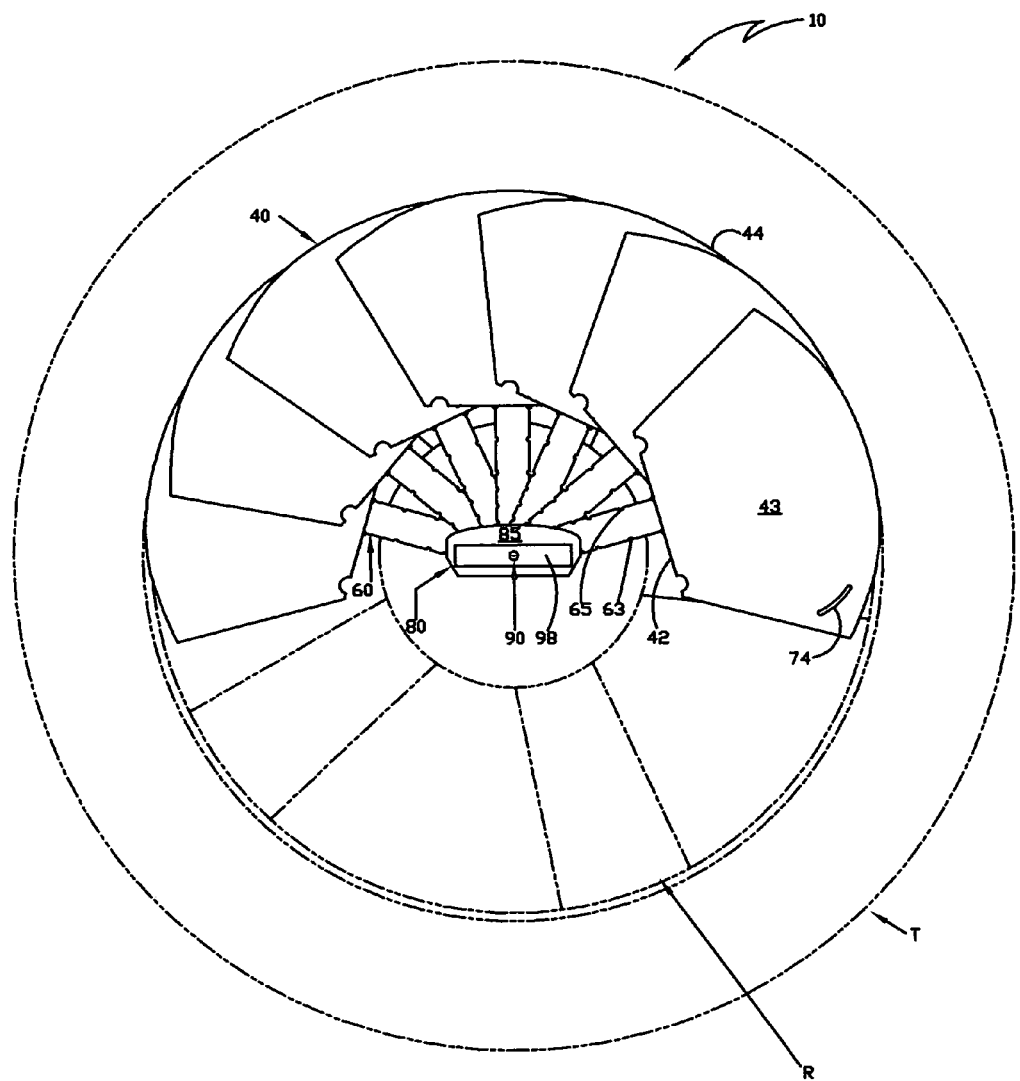
FIG. 1 represents front elevational view of the rim guard or shield object of the present application protecting a car wheel rim.

Referring now to the drawings, where the present invention is generally referred to with numeral 10, it can be observed that it basically includes a plurality of louvers 40 with respective elongated shaft members 60 and housing assembly 80, as seen in FIG. 1.

Figure 2:
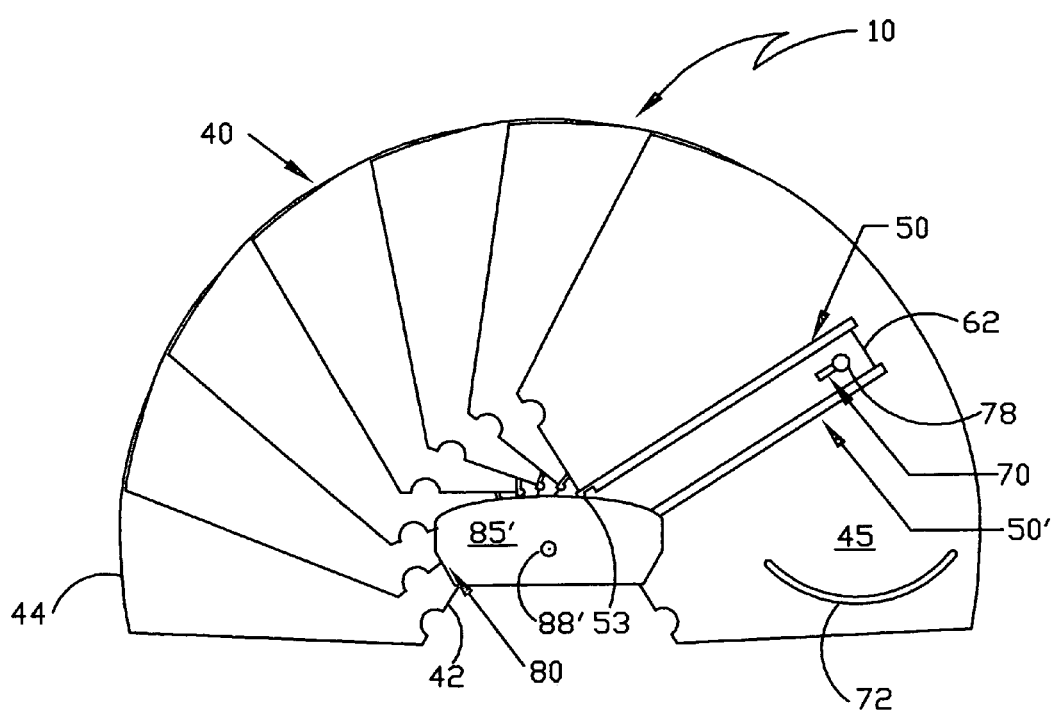
FIG. 2 illustrates a rear elevational view of the invention fully open with the louvers in a fully retracted disposition.

As seen in FIGS. 1 and 2, louver 40 has proximal end 42, distal end 44 and front and rear surfaces 43 and 45, respectively. Louver 40, in the preferred embodiment, has a substantially truncated pie section shape, opening between 50 and 70 degrees, as best seen in FIG. 3. The radius of curvature of distal end 44 varies towards the sides of louver 40. The radius of curvature is larger towards the sides and smaller in the central portion. This optimizes the area that is covered by louvers 40 when overlapping. Each louver 40 also includes elongated sliding track members 50 and 50' radially mounted parallel to each other at rear surfaces 45, with proximal ends 52 and 54, respectively, as best seen in FIG. 4. Sliding track members 50 and 50' have a substantially L-shape cross-section to permit elongated shaft members 60 to slide inbetween, as best seen in FIG. 4a. Spring lock members 53 and 55 extend inwardly from ends 52 and 54, respectively, as shown in FIG. 4.

Locking assembly 70 is integrated to louvers 40, as best seen in FIGS. 3, 4 and 4a. Locking assembly 70 includes, in the preferred embodiment, cavities 76; 176; 276; 376 and 476 and cooperating protruding ball 78. Protruding ball 78 protrudes from lifted section 77 of elongated shaft members 60 near distal end 62, as best seen in FIG. 4a. Protruding ball 78 has cooperative shape and dimensions to be received by cavities 76; 176; 276; 376 and 476 of contiguous louver 40. Cavities 76; 176; 276; 376 and 476 are located at predetermined locations on louvers 40 since ball 78 will engage them at different locations depending on the different rim sizes. When louvers 40 are brought together (aligned) for storage, balls 78 engage longitudinal slot 75 keeping the former in alignment. This disposition can be overcome by apply a pulling force of a predetermined magnitude on handle members 72 and 74 mounted on first and last louvers.

Elongated shaft members 60 are slidably received by track members 50 and 50' mounted on surface 45 of louvers 40. Elongated shaft members 60 include ends 62 and 64 and through opening 66. End 62 is slidably kept inside track members 50 and 50'. Inner portion 68 of shaft member 60 is thicker than outer portion 69, as best seen in FIGS. 6 and 7. Portions 68 keep shaft members 60 in a parallel and spaced apart relationship with respect to each other so that there is a clearance between adjacent shaft members 60.

Elongated shaft members 60 have notches 63 and 65 formed at the lateral edges in a spaced apart relationship with respect to each other, as best seen in FIGS. 1, 2 and 4. Notches 63 and 65 releasably and camingly receive spring lock members 53 and 55, respectively. Spring members 53 and 55 lock the different notches 63 and 65 corresponding different rim sizes, as seen in FIGS. 3 and 4. Elongated shaft member 60 also includes through opening 66 next to end 64 in portion 68, as best seen in FIG. 5. A user initially brings louver 40 out depending on the diameter of the rim to be protected. Then, louvers 40 slid laterally to cooperatively engage locking assembly 70. In this manner a user does not have to fumble with louvers 40 to match cavities 76; 176; 276; 376 and 476.

Handle member 72 has a substantially open U-shape and protrudes from rear surface 45 of the last louver 40, as best seen in FIGS. 4 and 5. Handle member 74 protrudes from front surface 43 of the first louver 40, as best seen in FIGS. 3, 5 and 6. Handle members 72 and 74 are cooperative disposed so the user can handle louvers 40 to set the preferred disposition according to the dimensions of rim shield 10.

As best seen in FIGS. 5 and 6, housing assembly 80 includes, in the preferred embodiment, base 84 and spaced apart and parallel walls 85 and 85'. Housing assembly 80 also includes through opening 88 at wall. Thick portions 68 of elongated shaft members 60 are stacked inside housing assembly 80.

As best seen in FIG. 6, axle assembly 90 passes through housing assembly 80 and it is mounted to opening 88 and wall 85'. Axle assembly 90 includes axle member 92, spacer 96 with through openings 97 and handle member 98. Axle member 92 includes ends 93 and 94. Axle 92 passes through openings 88, 66, 97, and finally is rigidly mounted to wall 85'. Spacer 96 is rigidly mounted to wall 85. Shaft members 60 are pivotally mounted to axle 92, as best seen in FIG. 6. As best seen in FIG. 5, handle member 98 is rigidly and perpendicularly mounted to end 93 of axle member 92. A user set the position of rim shield 10 and holds handle member 98 with one hand, thereby having his/her other hand free to perform the cleaning operation.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A guard for wheels including a rim, comprising:
A) a plurality of louvers having first and second surfaces and first and second ends and each louver further including a pair of parallel disposed track members longitudinally and radially mounted on said first surface;
B) a corresponding plurality of shaft members having third and fourth ends and said shaft members being slidably received within said track members;
C) housing means for pivotally receiving said third ends;
D) a plurality of first means for locking the relative position of each of said shaft members with respect to said cooperating track members; and
E) a plurality of second means for locking the relative angular positions of said shaft members with respect to adjacent louvers so that a user can selectively form an arch section to cover a substantial portion of a rim.

2. The guard set forth in claim 1 wherein said third fourth ends are thereby forming a clearance between adjacent fourth ends.

3. The guard set forth in claim 2 wherein said first means for locking include spring biased lock members extending radially inwardly form said track members and said shaft members including cooperating notches for camingly receiving said lock members thereby keeping said shaft members at a relative position with respect to said tack members.

4. The guard set forth in claim 3 wherein said second means for locking include a lifted section in said shaft members and including a protruding ball mounted thereon and said louvers further including cooperating cavities for camingly receiving said protruding balls thereby keeping said shafts and louvers at relative angular disposition to cover an arch for the different rim sizes.

5. The guard set forth in claim 4 wherein the first and last of said louvers include first and second handle members on said first and second surfaces, respectively.

6. The guard set forth in claim 5 wherein said housing means includes an axle member mounted therethrough and said third ends are pivotally mounted therein and said axle member extends outwardly from said housing means, and further including handle means mounted to said outwardly extending axle member.

* * * * *